US010185472B2

(12) United States Patent
Werner

(10) Patent No.: US 10,185,472 B2
(45) Date of Patent: Jan. 22, 2019

(54) METHOD FOR PROVIDING A USER INTERFACE, COMPUTER SYSTEM AND COMPUTER PROGRAM PRODUCT

(71) Applicant: FUJITSU LIMITED, Kawasaki-Shi (JP)

(72) Inventor: Steffen Werner, Munich (DE)

(73) Assignee: FUJITSU LIMITED, Kawasaki (JP)

( * ) Notice: Subject to any disclaimer, the term of this patent is extended or adjusted under 35 U.S.C. 154(b) by 1069 days.

(21) Appl. No.: 14/161,752

(22) Filed: Jan. 23, 2014

(65) Prior Publication Data
US 2014/0208243 A1 Jul. 24, 2014

(30) Foreign Application Priority Data
Jan. 24, 2013 (DE) ................ 10 2013 001 196

(51) Int. Cl.
*G06F 3/00* (2006.01)
*G06F 3/0484* (2013.01)
*G06F 8/38* (2018.01)

(52) U.S. Cl.
CPC ............ *G06F 3/0484* (2013.01); *G06F 8/38* (2013.01)

(58) Field of Classification Search
CPC ................................................ G06F 3/0484
See application file for complete search history.

(56) References Cited

U.S. PATENT DOCUMENTS

| 2006/0087502 | A1* | 4/2006 | Karidis | G06F 1/3203 345/211 |
| 2007/0169021 | A1* | 7/2007 | Huynh | G06F 19/3487 717/136 |
| 2007/0219645 | A1* | 9/2007 | Thomas | G05B 15/02 700/29 |
| 2009/0063765 | A1* | 3/2009 | Kottomtharayil | G06F 3/0619 711/112 |
| 2009/0307255 | A1* | 12/2009 | Park | G06Q 10/10 |
| 2011/0087988 | A1* | 4/2011 | Ray | G06Q 10/06 715/771 |
| 2012/0174002 | A1 | 7/2012 | Martin et al. | |
| 2013/0013727 | A1 | 1/2013 | Walker | |

* cited by examiner

*Primary Examiner* — Jeffrey A Gaffin
*Assistant Examiner* — Mohamed Abou El Seoud
(74) *Attorney, Agent, or Firm* — Fujitsu Patent Center

(57) ABSTRACT

A method provides a user interface for a computer system including providing a formal definition of a structured system configuration including at least one configuration unit having a plurality of configuration parameters; creating at least one configuration module assigned to the configuration unit; linking the configuration module to a configuration entity to retrieve configuration values assigned to the configuration parameters; retrieving configuration values from the configuration entity, and generating a user interface specific to the at least one configuration unit on the basis of at least one generic template for presenting the plurality of configuration parameters associated with the configuration unit and the associated configuration values retrieved for at least one predetermined client.

20 Claims, 5 Drawing Sheets

FIG 3

Scope Locations V6.0 – Eternus CS Locations

To support HA-Configurations within ETERNUS CS a location has to be assigned to each unit of the system. The number of locations used in a CS system depends on the model of the CS system. Internally the internal name of a location has to be used, all interfaces to the user should use the external name of a location. For more details see Document 5105.4212B_00104_CS_Location.doc from H.Eder

| Variable | Meaning |
|---|---|
| NAMES:\<LOCA>:\<LOCB>:\<LOCC><br>Example:<br>[ Locations ]<br>NAMES:LOCA:LOCB:LOCC<br>LOCA_INTNAME:A<br>LOCA_USRNAME:Augsburg<br>LOCA_COMMENT:Standort Augsburg<br>LOCB_INTNAME:B<br>LOCB_USRNAME:Bobingen<br>LOCB_COMMENT:Standort Bobingen<br>LOCC_INTNAME:C<br>LOCC_USRNAME:C<br>LOCC_COMMENT:Tiebreaker | List of location identifiers. Number of locations depends on current model, currently up to 3 locations allowed.<br><br>Example: NAMES:LOCA:LOCB:LOCC<br>Range: LOCA\|LOCB\|LOCC<br>Generated by: System |
| \<LOC>_INTNAME:\<value> | Internal location name.<br>NOTE:<br>The mapping between location identifier and internal location name is fix:<br>LOCA:A<br>LOCB:B<br>LOCC:C<br><br>Example: LOCA_INTNAME:A<br>Range: A\|B\|C<br>Generated by: System |
| \<LOC>_USRNAME:\<value> | External userdefined location name. Empty username is not allowed.<br><br>Example: LOCB_USRNAME:Bobingen<br>Range: Maximum 15 characters allowed (alphanumerical and -), empty value not allowed.<br>Default: Internal location name<br>Reconfigurable: Yes |
| \<LOC>_COMMENT:\<value> | Any user comment for location<br><br>Example: LOCC_COMMENT:Tiebreaker Location!<br>Range: Maximum 50 characters allowed, not allowed are special characters ',"$'}<br>Reconfigurable: Yes |

30
31
32

METHOD FOR PROVIDING A USER INTERFACE, COMPUTER SYSTEM AND COMPUTER PROGRAM PRODUCT

TECHNICAL FIELD

This disclosure relates to a method of providing a user interface for a computer system. The disclosure also relates to a computer system with program code that executes at least one application and to a computer program product suitable for execution on a computer system.

BACKGROUND

The spread of computer systems in all areas of life is continually advancing. Both the complexity of the individual computer systems, in particular of the available hardware, and the complexity of the applications running thereon and their dependences on one another are continuously increasing. At the same time, computer systems and their applications are being increasingly tailored to the needs of individual user groups.

On account of this general development, the development of graphical user interfaces in general and configuration interfaces in particular is taking up increasingly more development effort. The large amount of development effort when creating such interfaces simultaneously results in an increased requirement when testing the developed user interfaces using a multiplicity of test environments with different client systems and client applications, for example, web browsers and operating systems.

One example of a complex computer system comprising a plurality of complex hardware components and complex software components running thereon is the distributed, virtual tape library system for data backup from Fujitsu Technology Solutions GmbH sold under the name "Eternus CS" or "Eternus CS High End." Like a multiplicity of other complex computer systems, the so-called "Eternus CS?" system uses middleware used to manage and communicate with a multiplicity of hardware components by an application layer above it.

The middleware and the hardware components managed by the latter can be partially configured by a web-based graphical user interface (GUI). However, on account of the multiplicity of hardware and software components used and their configuration possibilities, it is currently virtually impossible to create a graphical user interface for all configurable parameters in a conventional manner. Complete adaptation of the web-based graphical user interface to all available configuration possibilities would excessively delay the further development of such complex systems and, as a result, would thus prevent expansion of the system with new hardware or software components.

Therefore, recourse is had to special configuration possibilities, for example, using a command line interface (CLI) to configure some parameters, in particular newly added or rarely used parameters. However, the practice of configuring parameters using a command line interface requires a large amount of experience of the user and is therefore not suitable for every user of the system.

It could therefore be helpful to provide a method of providing a user interface for computer systems, in particular for complex computer systems having a multiplicity of configuration possibilities and is suitable for a multiplicity of computer systems on the one hand, and for a multiplicity of client systems used by users, on the other hand.

SUMMARY

I provide a method of providing a user interface for a computer system including providing a formal definition of a structured system configuration including at least one configuration unit having a plurality of configuration parameters, creating at least one configuration module assigned to the at least one configuration unit and having methods of determining and retrieving associated configuration parameters and configuration values assigned to the configuration parameters, linking the at least one configuration module to a configuration entity of the computer system to retrieve configuration values assigned to the configuration parameters, retrieving configuration values for the plurality of configuration parameters for the at least one configuration module from the configuration entity, and generating a user interface specific to the at least one configuration unit on the basis of at least one generic, client-specific template from a plurality of templates for presenting the plurality of configuration parameters associated with the configuration unit and the associated configuration values retrieved from the configuration entity for at least one predetermined client, the at least one template being generic with respect to the configuration module and specific with respect to a type of a client used by a user.

I also provide a computer system with program code that executes at least one application, including a configuration entity that stores and provides a plurality of configuration values assigned to configuration parameters for the application, a communication server that provides a plurality of automatically generated, client-specific user interfaces for the application, the user interface including a configuration interface that retrieves the plurality of configuration parameters and retrieves and/or changes the configuration values assigned to the configuration parameters, and at least one middleware layer including at least one configuration module and a template management component that retrieves configuration values for configuration parameters assigned to the configuration module from the configuration entity using predetermined methods of the configuration module, to enter the values into generic, client-specific templates, the templates being generic with respect to the configuration module for presenting and/or changing the configuration values for the plurality of automatically generated, client-specific user interfaces and to output at least one of the templates filled with entered configuration values via the communication server based on the type of a client used by a user.

I further provide a non-transient storage device including a computer program product with executable program code, the program code carrying out selected steps when the program code is executed on a data process apparatus, including linking at least one configuration module including methods of determining and retrieving a plurality of configuration parameters associated with the configuration module and configuration values assigned to the configuration parameters to a configuration entity of the computer system, retrieving configuration values for the plurality of configuration parameters for the at least one configuration module from the configuration entity, and generating a user interface specific to the at least one configuration module on the basis of at least one generic, client specific template for presenting the plurality of configuration parameters associated with the configuration module and the associated configuration values retrieved from the configuration entity for at least one predetermined client, the at least one template being generic with respect to the configuration module and specific with respect to a type of a client used by a user.

BRIEF DESCRIPTION OF THE DRAWINGS

FIG. 3 shows a formal definition of a configuration unit of the computer system.

LIST OF REFERENCE SYMBOLS

Figure 1:
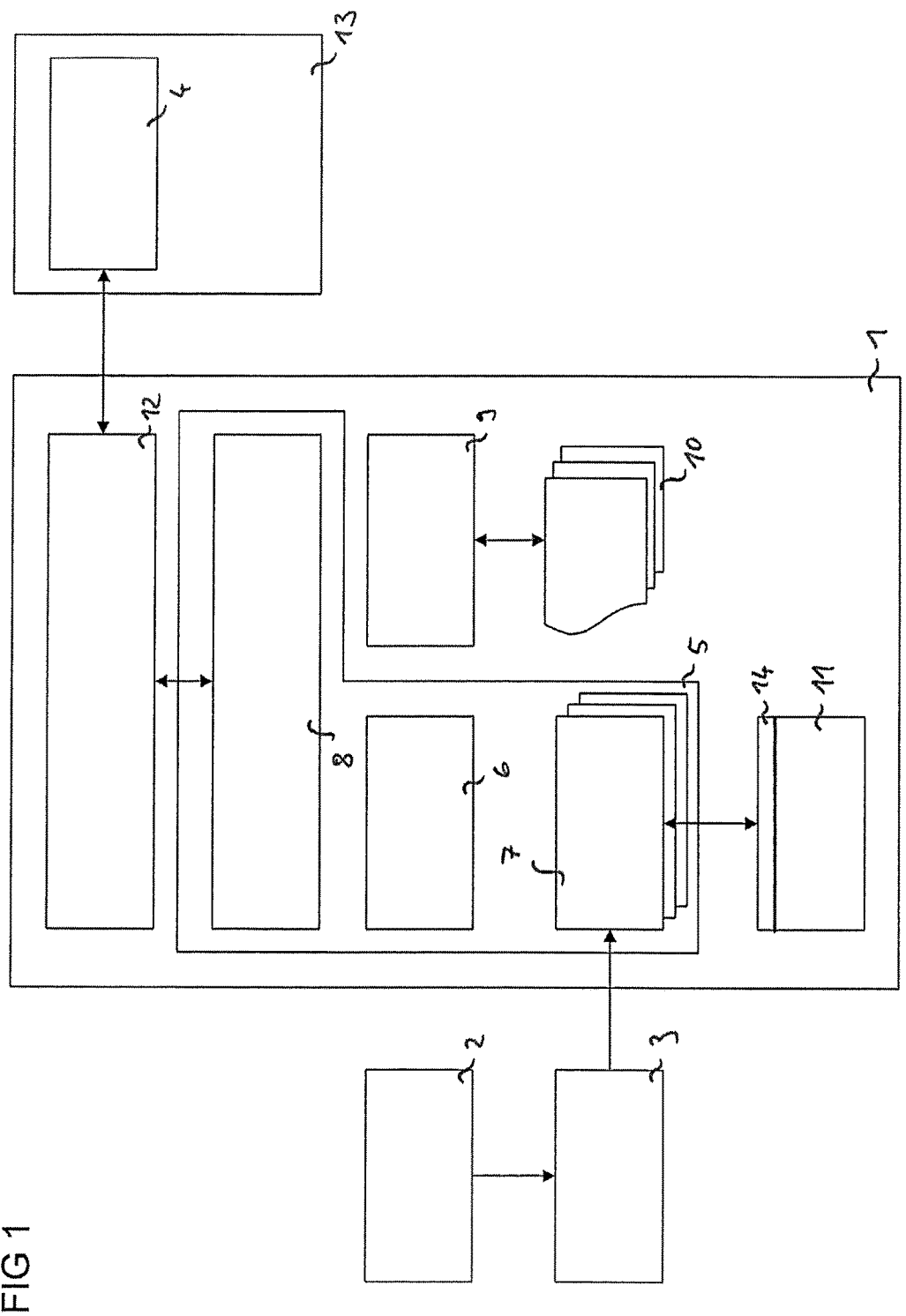
FIG. 1 shows a schematic illustration of a computer system for executing and configuring at least one complex application.

1 Cluster system
2 Documentation system
3 Implementation mechanism
4 User interface
5 Middleware layer
6 System-specific middleware
7 Configuration module
8 Template management component
9 Template processing component
10 Template
11 Configuration entity
12 Communication server
13 Client system
14 Interface
21 View
22 Selection tree
23 Input/output area
24 Title
25 Configuration parameter
26 Configuration value
27 Input element
28 View
29 View
30 Table
31 Left-hand column
32 Right-hand column

DETAILED DESCRIPTION

I provide a method of providing a user interface for a computer system. The method comprises the steps of:
  providing a formal definition of a structured system configuration comprising at least one configuration unit having a plurality of configuration parameters,
  creating at least one configuration module assigned to the at least one configuration unit and having methods of determining and retrieving the associated configuration parameters and configuration values assigned to the configuration parameters,
  linking the configuration module to a configuration entity of the computer system to retrieve configuration values assigned to the configuration parameters,
  retrieving configuration values for the plurality of configuration parameters for the at least one configuration module from the configuration entity, and
  generating a user interface specific to the at least one configuration unit on the basis of at least one generic, client-specific template from a plurality of templates for presenting the plurality of configuration parameters associated with the configuration unit and the associated configuration values retrieved from the configuration entity for at least one predetermined client, the at least one template being generic with respect to the configuration module and specific with respect to a type of a client used by a user.

The abovementioned steps make it possible to create a user interface in a largely automatable manner on the basis of a formal description of a structured system configuration. In this case, a configuration module which allows access to associated configuration parameters is created for a configuration unit. The configuration module created in this manner is used as an interface between a configuration entity and an automatically created user interface which is specific for a particular client, but generic with respect to the configuration parameters of the configuration unit. In this case, the user interface can be automatically created independently of the specific application on the basis of a generic template by evaluating the data provided via the configuration module.

If there are a plurality of configuration units for the computer system, an associated separate configuration module is preferably created for each configuration unit.

In the step of generating a user interface specific to the configuration module, a type of client used by a user may be queried and the user interface created on the basis of one client-specific template from a plurality of client-specific templates which is assigned to the queried type. Different user interfaces can be provided on the basis of the same configuration module by querying and evaluating a type of client used by the user. For example, it is possible to simultaneously generate a user interface for graphical client software dependent on the operating system and for a web-based user interface independent of the operating system.

In the step of creating the at least one configuration module, a definition file comprising a definition of the methods assigned to the configuration module may be created for each configuration module to be created. Such a definition file, for example, a so-called "header file" for a program module programmed in the C or C++ programming language, allows the functionality formally provided by the configuration modules to be separated from its actual implementation.

In the step of creating the at least one configuration module, program code for outputting the configuration parameters associated with the configuration module and configuration values assigned to the respective configuration parameters may be created for each configuration module to be created. Specifying program code for outputting configuration parameters and associated configuration values makes it possible to implement the retrieval and checking of configuration parameters for the configuration units separately from the creation of the actual graphical user interface, which reduces the complexity during programming.

The method described is particularly suitable in creating program code to convert functionalities of the configuration modules into program code in a programming language in a first substep, which program code is translated into executable program code in a second substep.

I also provide a computer system with program code that executes at least one application. The computer system comprises a configuration entity that stores and provides a plurality of configuration values assigned to configuration parameters for the application, a communication server that provides a plurality of automatically generated, client-specific user interface for the application, the user interface comprising a configuration interface that retrieves the plurality of configuration parameters and retrieves and/or changes configuration values assigned to the configuration parameters, and a middleware layer. In this case, the middleware layer comprises at least one configuration module and a template management component set up to retrieve configuration values for configuration parameters assigned to the configuration module from the configuration entity using predetermined methods of the configuration module, to enter the values into generic, client-specific templates, the templates being generic with respect to the configuration module to present and/or change the configuration values for the plurality of automatically created user interfaces and to output the template filled with the entered configuration values via the communication server based on the type of a client used by a user.

An adapted, client-specific user interface for the application, in particular to configure its components, can be created for a multiplicity of different system configurations by expanding a middleware layer of a computer system with at least one configuration module and a template management component.

I further provide a computer program product with executable program code. Such a computer product can be stored on a non-transient medium such as a CD-ROM, hard disk drive or internal chip memory of a computer system.

The advantages of the computer program product correspond to those of the methods and computer systems.

Further advantages are disclosed in the following detailed description of examples with reference to the appended figures.

FIG. 1 shows a schematic illustration of a computer system having a user interface that configures an example of my computer system.

In the example, the computer system illustrated is a cluster system 1 on which different software components for implementing a distributed application run. In this case, FIG. 1 illustrates only those software components used to configure the cluster system 1 or the application running on the latter. Application-specific components are not illustrated in FIG. 1 for reasons of clarity.

In addition to the cluster system 1, the described arrangement comprises a documentation system 2 and an implementation mechanism 3. The cluster system 1 is operated and/or configured by an administrator or other user of the cluster system 1 from a client system 13 via a user interface 4, for example, a graphical user interface displayed in a web browser.

The cluster system 1 comprises an illustrated example of a middleware layer 5 which, in addition to the system-specific middleware 6, for example, a software component that provides particular system functions by individual components of the cluster system 1, comprises one or more configuration modules 7 and a template management component 8.

In the example, the system-specific middleware 6 is set up to control the entire cluster system 1. Its tasks comprise, inter alia, the monitoring of system events, the starting and/or stopping of processes and configuration of the cluster system 1. For this purpose, the system-specific middleware 6 connects to all essential parts of the cluster system 1 and has access to all relevant information relating to the cluster system 1.

The template management component 8 can use a template processing component 9 to access different templates 10 to provide user interfaces 4 of the cluster system 1 for different client systems 13. In this case, different templates 10, for example, to create user interfaces 4 on the basis of the HyperText Markup Language (HTML), the Tcl/Tk script language and other output systems, can be used to create suitable user interfaces 4 for different client systems on the basis of the same configuration module.

The configuration module(s) 7 can use an interface 14 to access a central configuration entity 11 which stores configuration parameters and assigned configuration values for all components of the cluster system 1. For example, the central configuration entity 11 is a register with attribute value pairs, a database, a directory system or a structured, computer-readable text file. The following example shows an excerpt from a possible configuration file for a configuration unit:

[Locations]
NAMES:LOCA:LOCB:LOCC
LOCA_INTNAME:A
LOCA_USRNAME:AABB
LOCA_COMMENT:aaaaaaaa
LOCB_INTNAME:B
LOCB_USRNAME:B
LOCB_COMMENT:BBBBBBBB
LOCC_INTNAME:C
LOCC_USRNAME:C
LOCC_COMMENT:ccccccccXXXXXXX In the example, the cluster system 1 also comprises a communication server 12 in the form of a web server that provides application-specific user interfaces 4 created by the template management component 8. The communication server 12 is used to easily distribute definitions of different user interfaces 4 to different client systems 13. The Hypertext Transport Protocol (http) known from the World Wide Web (WWW) is suitable for this purpose, for example. In addition to user interfaces based on HTML and other formats known from the WWW, the web server is provides user interfaces according to other standards and proprietary formats, for example, as a web service via SOAP, using a Tcl/Tk script or as a command line interface.

The components 7 and 8 of the middleware layer 5 with a grey background illustrated in FIG. 1 allow, in combination with the documentation system 2 and the implementation mechanism 3, the largely automatic and standardized generation of a user interface 4 specific to the application executed by the cluster system 1. The method used for this purpose is described in detail below using the refinement according to FIG. 1.

Changes to the attributes to be configured and associated configuration values may result during the further development of the actual application which, in this case, is centrally controlled by the system-specific middleware 6. To make the expanded configuration possibilities consistently available to an administrator of the cluster system 1 at any time, a plurality of configuration modules 7 are provided in the system according to FIG. 1, which modules are created by the developer(s) of the cluster system 1 and describe an associated stage of development of the application.

In the refinement described, each configuration module 7 is a piece of binary code which can be executed by one or more computers of the cluster system 1. The binary code does not comprise any code for implementing a graphical interface. The binary code is created according to a fixed scheme by the implementation mechanism 3 which is in turn based on a formal definition maintained in the documentation system 2 in parallel with the development of the actual application. For example, the documentation system 2 is a Wiki-based documentation system which describes the configuration units used and associated configuration parameters in detail.

The sequences of expanding the cluster system and the application running on the latter are standardized. Both the documentation in the documentation system 2 and the configuration modules 7 and their creation by the implementation mechanism 3 are based on so-called "template mechanisms," that is to say the filling-in of prepared templates which allow identical repetition of standard tasks by different developers.

As soon as a new or changed configuration module 7 has been introduced into the cluster system 1, for example, by making a new library available or by recompiling a source code of an application running thereon, the corresponding configuration module 7 is able to retrieve the configuration parameters newly provided in the cluster system 1 from the configuration entity 11 and to evaluate the parameters according to the semantics of the application. Conversely, the configuration module 8 can determine configuration values on the basis of a specific system configuration of the cluster system 1 or can receive the values from the user interface 4 and can store them in the configuration entity 11. In this case, the configuration module(s) 7 itself/themselves form(s) an integral part of the middleware layer 5.

The template management component 8 which is likewise integrated in the middleware layer 5 is used to preprocess the configuration parameters for the cluster system 1, which are stored in the configuration entity 11 and retrieved by the configuration modules 7 in a manner comprehensible to a user of the cluster system 1, preferably in a graphical manner, and to display them via the user interface 4. Conversely, the template management component 8 ensures that inputs made by a user via the user interface 4 are forwarded to the cluster system 1 via the configuration modules 7 and are converted into instructions which can be understood by the cluster system 1 or configuration values stored in the configuration entity 11, with the result that it is also possible to change the configuration of the cluster system 1 via the user interface 4.

For this purpose, the template management component 8 obtains system-specific configuration information relating to a configuration unit, for example, a subcomponent or a specific configuration view, from the configuration entity 11 via an associated configuration module 7. In the example, the configuration information comprises, in particular, the available configuration parameters and associated configuration values for a configuration unit. The configuration information acquired in this manner is inserted into a generic template 10 suitable for a client type used by the user and is processed by the template processing component 9 to produce the user interface 4.

For example, the template processing component 9 may be a transformation engine, for example, a so-called XSLT transformer, which processes predetermined templates, for example, so-called "style sheets," on the basis of the information provided via the configuration modules 7. HTML pages that generate the user interface 4 generated in this manner and are individualized for configuration of the cluster system 1 are output via the communication server 12. For example, the HTML pages generated can be transmitted to a web browser of the client system 13 belonging to the administrator or another user using the HTTP protocol.

In the example described, there is correspondence between the information stored in the documentation system 2, the configuration modules 7 generated by the implementation mechanism 3 on the basis of the information in the documentation system 2 and the configuration information stored in the configuration entity 11. In the example, information in the configuration entity 11 is stored in a single configuration file comprising sections constructed according to the same scheme and describe the individual configuration units of the cluster system 1. This corresponds to the formal definition of the cluster system 1, as is stored in the documentation system 2. In this case, a definition of a separate configuration module 7 is generated for each configuration unit by the implementation mechanism 3 and implemented as computer-executable binary code.

Implementation is effected here by using a structured programming language. In the example, the C programming language is used, in particular, to create an associated configuration module 7 in the form of a program module for each configuration unit of the formal documentation system 2. Implementation can also be effected in any other suitable programming language. In this case, each program module has one or more attributes which store current configuration values for a predetermined configuration parameter for the respective configuration unit. In this case, the implementation mechanism 3 generates standardized methods of determining, retrieving and/or specifying the respective configuration parameters. These standardized methods can be retrieved by the template management component 8 during ongoing operation to present the configuration parameters and associated configuration values provided by a configuration module via the user interface 4. Furthermore, the methods created according to a fixed scheme allow configuration values to be retrieved and saved in the central configuration entity 11.

As a result of the fact that templates are used in all sections of the process of generating the user interface 4, it is possible to convert identical or similar elements of the cluster system 1 into graphical operating elements of the user interface 4 in a consistent manner. What can be seen in a specific configuration window of the user interface 4 at the end therefore solely depends on the development process or stage of development, as is recorded in the documentation system 2.

Figure 2A:
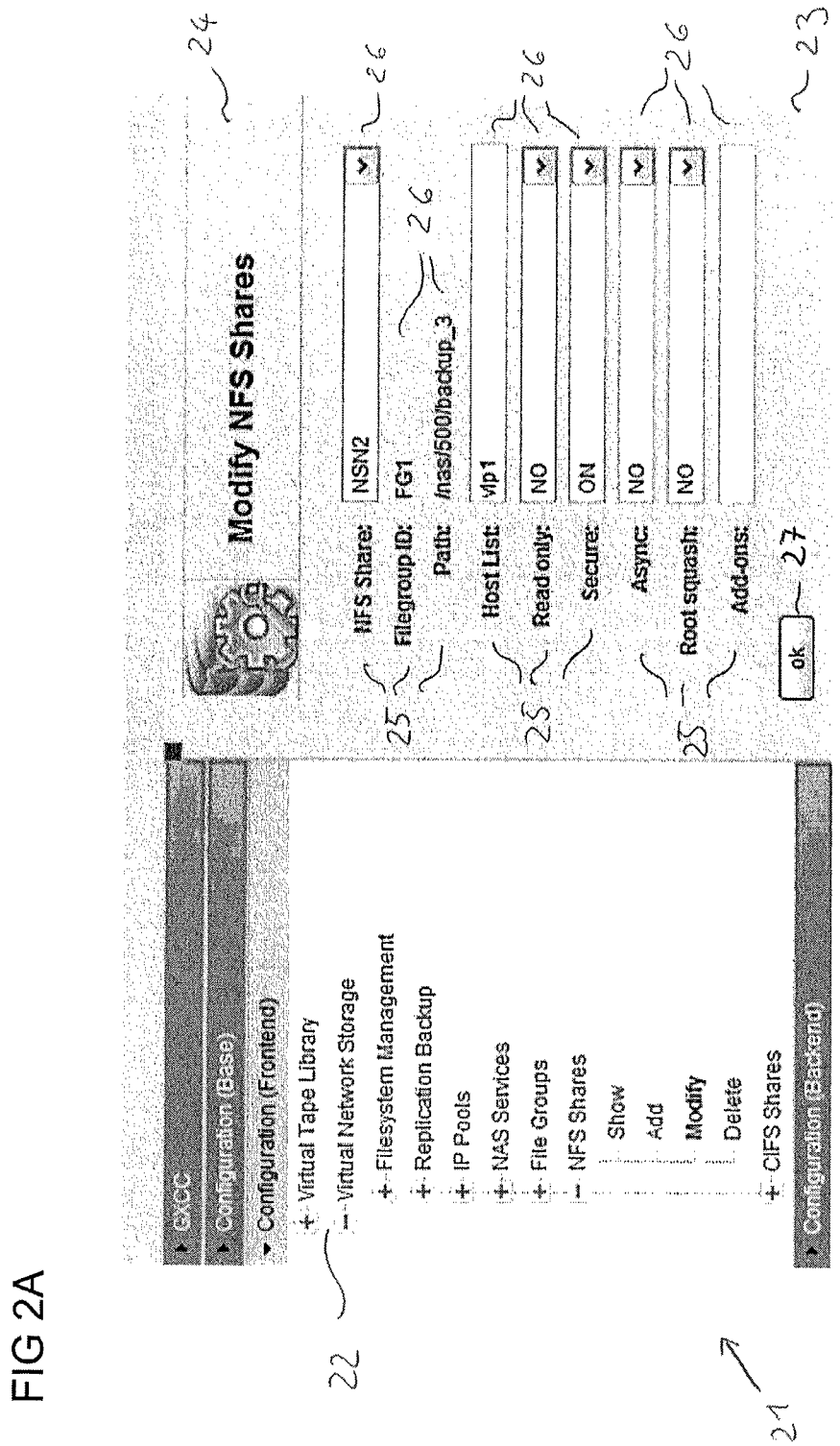
FIGS. 2A to 2C show different views of a user interface of the computer system.
Figure 2B:
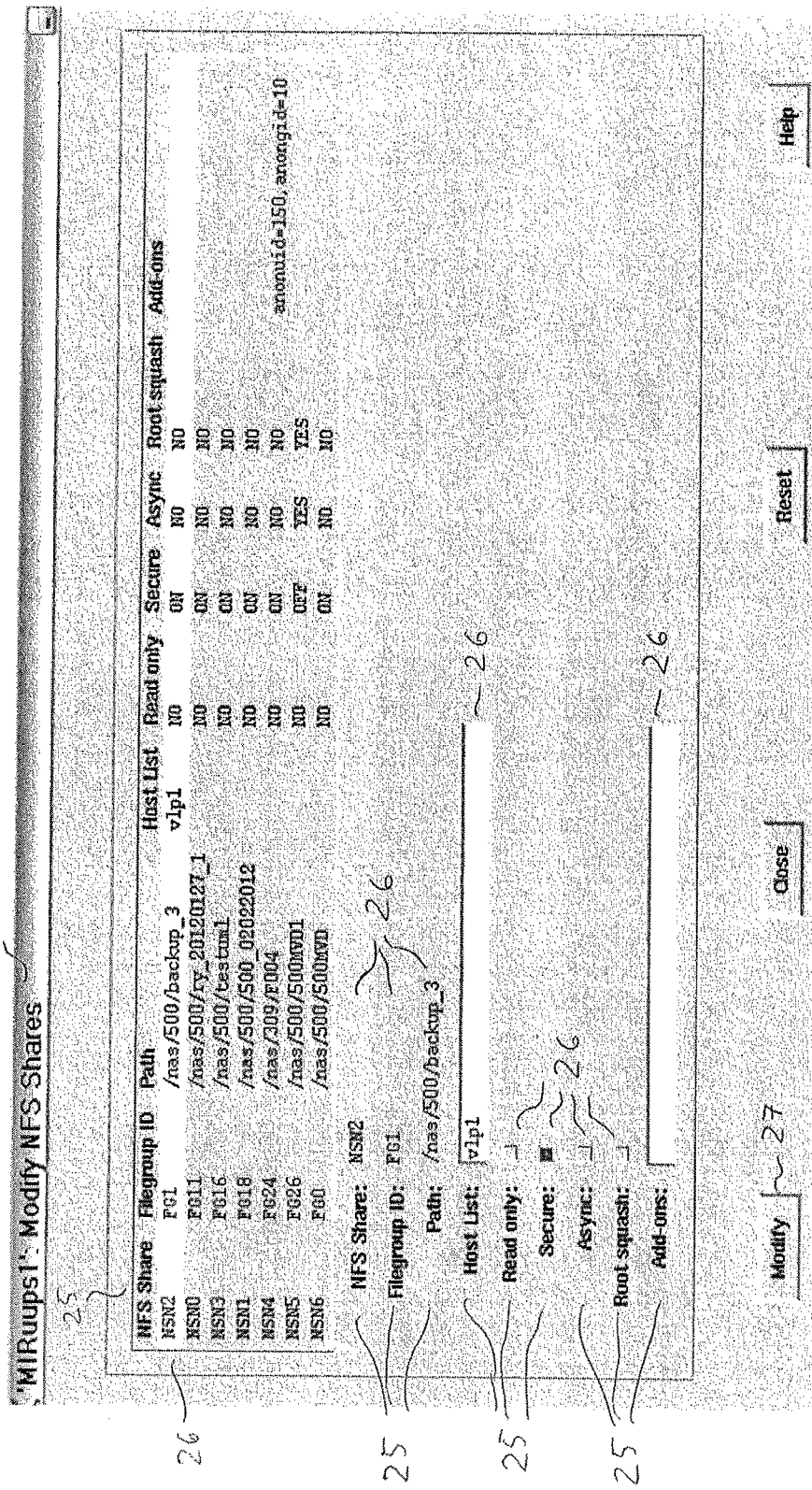
Figure 2C:
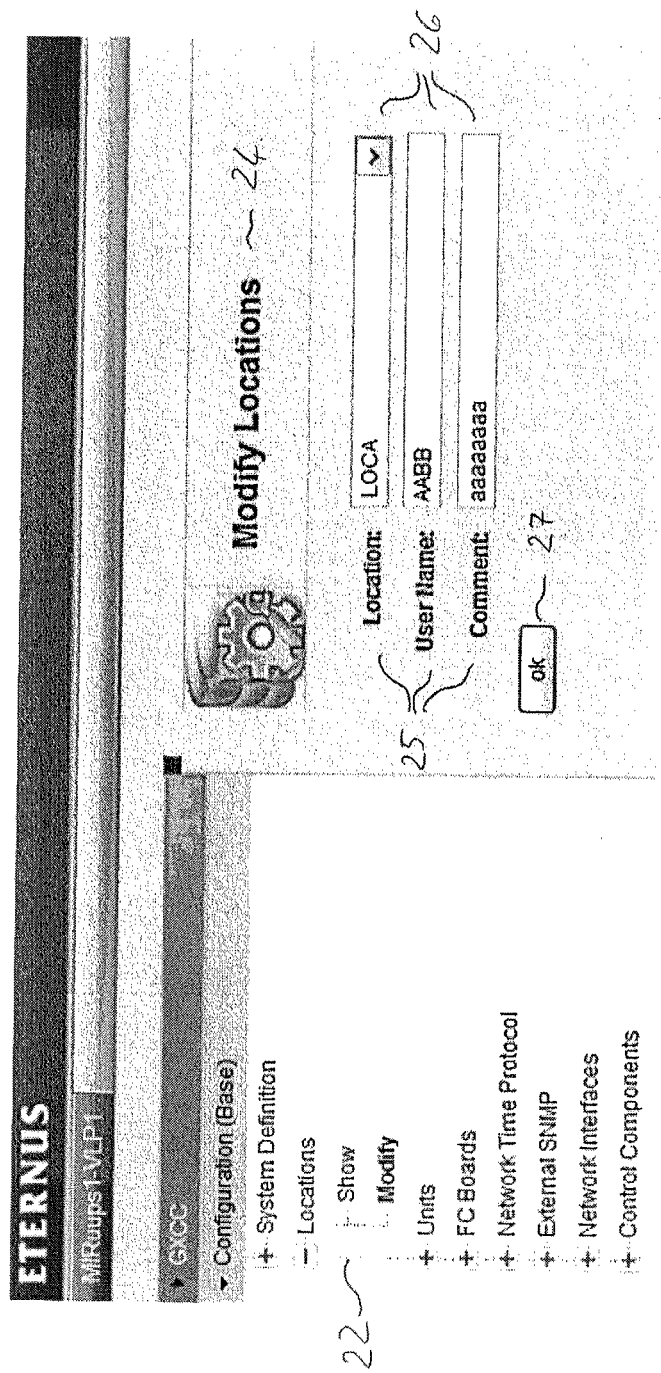

FIGS. 2A to 2C illustrate different views of a user interface 4 to configure different configuration parameters. The user interface 4 illustrated in FIGS. 2A and 2B comprises configuration views for the same configuration unit with the designation "NFS Shares," where FIG. 2A illustrates a so-called "web application" and FIG. 2B illustrates a so-called "Tcl/Tk application." FIG. 2C illustrates a further configuration view for a further configuration unit with the designation "Locations," which, like the view in FIG. 2A, is displayed in a browser belonging to a user or an administrator. The illustrated user interface 4 according to FIGS. 2A and 2C is based on coding in the so-called "HyperText Markup Language (HTML)" and technologies based thereon such as, in particular, Javascripts and other known techniques for implementing web applications.

FIG. 2A illustrates a first view 21 to configure a configuration unit with the designation "NFS Shares." The view 21 is roughly divided into a selection tree 22 arranged on the left-hand side and an input/output area 23 arranged on the right-hand side. Different configuration views, for example, for different configuration units, can be selected using the selection tree 22. In addition to the configuration modules 7 directly assigned to individual configuration units, other configuration views can also be manually provided in the described system by creating associated configuration modules 7 which combine, for example, configuration parameters for different configuration units to form a uniform aspect of the cluster system. This possibility provides additional flexibility when creating the user interface 4. In the illustrated example, it is possible to choose, for each configuration view, whether current configuration parameters and values are only intended to be displayed (selection point "show") or are also intended to be changed (selection point "modify"). In the view 21 according to FIG. 2A, the configuration parameters for the configuration unit "NFS Shares" are selected for editing.

The configuration parameters selected using the selection tree 22 are illustrated in the input/output area 23. In this case, the configuration parameters which can be changed are summarized below the title 24 of the selected configuration unit. A further subdivision, for example, into subordinate groups, is also conceivable. One or more configuration parameters 25 are illustrated below the title 24. In this case, a parameter name and an associated configuration value 26 are illustrated for each configuration parameter 25. In the selected editing view, the configuration values 26 can be manipulated using associated, suitable input elements. For example, for the configuration parameter 25 with the designation "NFS Share," it is possible to use a selection box to choose between permissible, specified configuration values 26 assigned to NFS Shares automatically detected by middleware, for example. Other configuration parameters 25, for instance the parameters with the designations "Filegroup ID" and "Path," are blocked to user inputs and do not allow the configuration values 26 to be changed. A further configuration parameter 25 with the designation "Host List" can be freely changed using a text input field. An input element 27 for confirming the changes which have been made can additionally be seen in the view 21 according to FIG. 2A.

The view 21 according to FIG. 2A makes it possible to present and edit configuration parameters 25 in a structured manner. In this case, input can be restricted from the outset to meaningful configuration values, as are stored in the documentation system 2. As a result of the fact that the user interface 4 is automatically created, all configuration parameters 25 stored in the documentation system 2 are available for configuration.

FIG. 2B shows a further view 28 of the same configuration unit "NFS Shares" in a different client system 13 to configure the same cluster system 1. It can be seen that the same configuration parameters 25 can be presented and set, via a user interface specific to the client system 13, here a Tcl/Tk application, using input elements adapted to the configuration parameters 25 to be configured and to their configuration values 26.

FIG. 2C shows a further view 29 of the same user interface 4. An input/output area 23 for changing configuration parameters 25 for the configuration unit with the designation "Locations" can be seen in the view 29 according to FIG. 2C. In addition to the title 24, the input/output area 23 contains only three configuration parameters 25 and associated configuration values 26 as well as the input element 27.

The associated documentation system 2 and the configuration module 7 based thereon are described below using the relatively simple view 29 according to FIG. 2C and using FIG. 3. FIG. 3 illustrates the entry for the configuration unit "Locations" in the documentation system 2. It can be seen in the illustration according to FIG. 3 that the available configuration parameters 25 are listed in a left-hand column 31 of a table 30. Examples, allowed ranges of values and further configuration options, in particular details of the origin of the configuration values 26 and their editing possibilities, are specified in the associated fields in the right-hand column 32.

The parameter "Locations" is a firmly specified configuration parameter 25 generated by the software system and has the range of values LOCA, LOCB and LOCC. In the example, these are details of mutually independent locations of a distributed data backup system 1 provided by the cluster system 1. For each configuration value LOCA, LOCB and LOCC, there are further configuration parameters 25 available with regard to an internal name, a user name and a comment, which parameters are described in more detail in the following rows of the table 30.

In addition to configuration parameters 25 firmly specified by the cluster system and stored in the configuration entity 11, further configuration parameters 25 or their configuration values 26 may be dynamically acquired by the system-specific middleware 6, for example, at the runtime, and may be presented using the user interface 4. Such configuration parameters are also defined and documented in the documentation system 2 (not illustrated in FIG. 3).

On the basis of the information contained in the table 30, a programmer can create program code to create an associated configuration module 7 to configure the configuration unit "Eternus CS Locations." This program code is reproduced below:

```
general handler definition, link to action 'modify'
void
locationsHandler(cmd_query_return_t *p_ret, vtls_conf_t *p_conf, int p_mem_id, int p_action,
vc_name_value_t *p_args, int p_args_cnt)
{
    conf_def_t obj_container = { 0 };
    nv_field_t *input_fields = NULL;
    if(get_obj_definition(&obj_container, p_mem_id))
        input_fields = locsInputDefinition(p_action, NULL, obj_container.header);
    if(!input_fields) { add_action_error(p_ret, p_mem_id, p_action); return; }
    call_do_modify_name(p_ret, p_conf, &obj_container, input_fields, p_action, p_args,
p_args_cnt, locsAutoFields);
    return;
}
Header definiton for CLI
char *locs_ header[ ] = { "Status", "name", "internal_name", "user_name", "comment" };
CLI example to show the actual configuration (locs_header)
##-------------------------------------------------------------
:> call CTL_Locations.show ''
Status,name,internal_name,user_name,comment
Same,LOCA,A,AABB,aaaaaaaa
Same,LOCB,B,B,BBBBBBBB
Same,LOCC,C,C,ccccccccXXXXXXX
RET:00
```

```
conf_field_t *
locsFieldsDefinition(int *p_cnt)
{
    static conf_field_t locs_fields[ ] = {
        {LOCS_INAM,1,LOCS_NAME,SCOPE_INTNAME,0,':'}, ## Location
        {LOCS_UNAM,1,LOCS_NAME,"_USRNAME",0,':'}, ## User Name
        {LOCS_COM, 1,LOCS_NAME,"_COMMENT",0,':'} ## Comment
    };
    *p_cnt = sizeof(locs_fields)/sizeof(locs_fields[0]);
    return locs_fields;
}
conf_name_t *
locsNameDefinition(void)
{
    static conf_name_t locs_name = { 0 };
    locs_name.prefix = "LOC";
    locs_name.range_start = "A"; ## Range: LOCA - LOCC
    locs_name.range_end = "C";
    locs_name.base = 16;
    return &locs_name;
}
Modify fields
nv_field_t *
locsInputDefinition(int p_action, char *p_type, char **p_header)
{
    nv_field_t *locs_fields; int yy;
    static nv_field_t modify_fields[ ] = {
        {LOCS_NAME, NULL, I_REQUIRED}, ## Location
        {LOCS_UNAM, NULL, 0, VTLS_ LOCATION_UNAME_REG}, ## User Name
        {LOCS_COM, NULL, 0, VTLS_LOCATION_COM_REG}, ## Comment
        {0, 0}
    };
    if(p_action & CA_MODIFY_ID) { locs_fields = modify_fields;}
    else            return NULL;
    for(yy = 0; locs_fields[yy].id; yy++) {
        if(!locs_fields[yy].label)
            loc_ fields[yy].label = p_header[locs_fields[yy].id];
    }
    return locs_fields;
}
void
locationsDefinition(conf_def_t *p_locs)
{
    p_locs->entry = locsFieldsDefinition(&p_locs->field_cnt);
    p_locs->idx_format = locsNameDefinition( );
    p_locs->last_idx = LOCS_LAST;
    p_locs->status_idx = LOCS_STAT; ### Status: new, same, deleted
    p_locs->key_idx = LOCS_NAME; ### LOCA, LOCB, LOCC
    p_locs->scope = VTLS_SCOPE_LOCATIONS; ### Scope name
    p_locs->header = locs_header; ### Header for show output
    p_locs->def_flags = DEF_SORT_NAMES;
    p_locs->scope_id = CTL_LOCATIONS; ### Scope ID
    p_locs->key_tr = UI_DICT_CONFIG_LOCATIONS_NAME; ### Link to Dictionary
    p_locs->scope_tr = UI_DICT_CONFIG_LOCATIONS_SCOPE; ### Link to Dictionary
    p_locs->input_fields = locsInputDefinition; ### Link to input field definition
}
```

It can be seen in the program code that the definitions of the configuration parameters 25 (referred to as "input_fields" in the program code) are read in there and are allocated to the associated method "modify." The method provided makes it possible to manipulate the data. The program code for the associated field allocation is also seen. The relationship to the corresponding information in the documentation system 2 according to FIG. 3 can already be seen here.

Finally, Python code for the translations to the user interface 4 is illustrated below. The presentation, as illustrated in FIG. 2B, for example, automatically results using this translation and the template management component 8 with an associated template 10:

```
ui_translate.add(id="ui_dict_config_Locations_scope",
    lang="en",
    cli_option=None,
    cli_label="Locations",
    gui_label="Locations", ### Header line on Screenshot
    translation=[ ])
ui_translate.add(id="ui_dict_config_Locations_name",
    lang="en",
    cli_option="location",
    cli_label="Location",
    gui_label="Location", ### Label on Screenshot
    translation=[ ])
ui_translate.add(id="ui_dict_config_Locations_internal_name",
    lang="en",
    cli_option=None,
    cli_label="Name",
    gui_label="Name",
    translation=[ ])
```

-continued

```
ui_translate.add(id="ui_dict_config_Locations_user_name",
    lang="en",
    cli_option="user_name",
    cli_label="User Name",
    gui_label="User Name", ### Label on Screenshot
    translation=[ ])
ui_translate.add(id="ui_dict_config_Locations_comment",
    lang="en",
    cli_option="comment",
    cli_label="Comment",
    gui_label="Comment", ### Label on Screenshot
    translation=[ ])
```

The conversion of the information contained in the documentation system 2 into the above program code is carried out manually by a programmer in the refinement described. However, all of the information needed for programming is already contained in the documentation system 2 in this case, with the result that the specified methods for the configuration module 7 to be created can be created according to a fixed scheme using a template. This minimizes the risk of programming errors. In this case, the system described allows graphical and other user interfaces to be produced without the need for the programmer to implement graphical operating elements. Only the loading of a new configuration module 7 into the system generates all necessary notifications. Such a procedure makes it possible to achieve, inter alia, the advantages cited below:

1. Experts are needed only when creating the documentation in the documentation system 2. On the basis of the information contained therein, all of the following steps, in particular the implementation of the configuration modules 7 and the creation and presentation of user interfaces 4, can be carried out without expert knowledge of the system to be implemented.
2. Creation of the configuration modules 7 requires only a minimum amount of manual effort. On the basis of the formal definition in the documentation system 2, semi-automatic or fully automatic creation of the associated program code is even possible.
3. Even complex systems, for example, cluster systems with different interacting hardware and software components, can be created with a small amount of development effort using a central user interface 4, in particular a user interface to configure all included components. This makes it possible to save years of development work for manually programming graphical user interfaces.
4. When developing the user interfaces 4, the responsible programmer can concentrate on the configuration parameters 25 and configuration values 26 to be acquired. In particular, graphics or web know-how is no longer required when developing the user interface 4.
5. As a result of the fact that the graphical presentations of the user interface 4 are always created in the same manner, it is also not necessary to manually test the user interfaces 4 which have been created, which results in a further, considerable saving in terms of effort. Regression or unit tests which can be automated are sufficient for testing the functionality of the user interface 4.
6. Automatic generation of the user interface 4 guarantees that all operating elements for displaying or changing configuration values 26 can always be presented and operated in an absolutely identical manner. This improves the software ergonomics.
7. Centralization of the configuration of a complex system facilitates operation of complex systems with a single user interface 4.
8. The modular approach of the described system also allows the system to be expanded by adding further subsystems with associated configuration modules 7.
9. As a result of modular expandability, the system which can be controlled thereby can be scaled in a virtually arbitrary manner.
10. As a result of the semi-automatic creation of the user interface 4, the latter is immediately available after the respective configuration parameters 25 have been defined in the documentation system 2. In particular, an associated user interface 4 to configure all existing configuration parameters 25 is therefore immediately available with the insertion of new components into a complex system.

The invention claimed is:

1. A computer system with program code that executes at least one application, comprising:
    a configuration entity that stores and provides a plurality of configuration values assigned to configuration parameters for an application of the at least one application;
    a communication server that provides a plurality of automatically generated, client-specific user interfaces for the application, the user interface comprising a configuration interface that retrieves the plurality of configuration parameters and retrieves and/or changes the configuration values assigned to the configuration parameters; and
    at least one middleware layer comprising at least one configuration module and a template management component that retrieves configuration values for configuration parameters assigned to the at least one configuration module from the configuration entity using predetermined methods of the at least one configuration module, to enter said values into generic, client-specific templates, the templates being generic with respect to the at least one configuration module for presenting and/or changing the configuration values for the plurality of automatically generated, client-specific user interfaces and to output at least one of the templates filled with entered configuration values via the communication server based on the type of a client system used by a user, wherein the computer system is configured to query the type of the client system used by the user and to select at least one template from a plurality of templates based on the queried type.

2. The computer system according to claim 1, wherein the computer system is configured to query the type of the client system used by the user and to select at least one template from a plurality of templates based on the queried type.

3. The computer system according to claim 1, wherein the plurality of automatically generated, client-specific user interfaces comprises at least a first user interface for a graphical client software dependent on an operating system of the client system and a second user interface for a web-based user interface independent of the operating system of the client system.

4. The computer system according to claim 1, wherein the communication server comprises a web server configured to provide the plurality of automatically generated, client-specific user interfaces specific for at least one application via Hypertext Transport Protocol to different client systems accessing said application.

5. The computer system according to claim 3, wherein the plurality of automatically generated, client-specific user interfaces comprises at least one of the following: a Hypertext Markup Language (HTML) interface, a web service interface provided via the Simple Object Access Protocol (SOAP), a Tool Command Language Toolkit (Tcl/Tk) script interface or a command line interface.

6. The computer system according to claim 1, wherein the template management component comprises a transformation engine, which processes predetermined templates on the basis of retrieved configuration values for configuration parameters assigned to at least one configuration module.

7. The computer system according to claim 6, wherein the transformation engine comprises an XSLT transformer, which processes predetermined style sheets corresponding to the predetermined templates.

8. The computer system according to claim 7, wherein a plurality of HTML pages are generated and individualized by the XSLT transformer and output via the communication server, wherein the plurality of generated HTML pages provide a user interface for configuration of a cluster system.

9. A cluster system configured to run a plurality of software components for implementing a distributed application, wherein the cluster system is configured by an administrator of the cluster system from a client system via a user interface, the cluster system comprising:
 a configuration entity that stores and provides a plurality of configuration values assigned to configuration parameters for the distributed application;
 a communication server that queries a type of a client system used by the administrator of the cluster system and provides a plurality of automatically generated, client-specific user interfaces for the distributed application, the user interface comprising a configuration interface that retrieves the plurality of configuration parameters and retrieves and/or changes the configuration values assigned to the configuration parameters; and
 at least one middleware layer comprising a system-specific middleware component set up to control the cluster system, at least one configuration module and a template management component that retrieves configuration values for configuration parameters assigned to the at least one configuration module from the configuration entity using predetermined methods of the at least one configuration module, to select at least one template from a plurality of generic, client-specific templates based on the queried type, the templates being generic with respect to the at least one configuration module for presenting and/or changing the configuration values for the plurality of automatically generated, client-specific user interfaces, to enter said values into the at least one selected template and to output the at least one selected template filled with entered configuration values via the communication server based on the type of a client system used by the administrator of the cluster system.

10. The cluster system according to claim 9, wherein the plurality of automatically generated, client-specific user interfaces comprises at least a first user interface for a graphical client software dependent on an operating system of the client system and a second user interface for a web-based user interface independent of the operating system of the client system.

11. The cluster system according to claim 9, wherein the communication server comprises a web server configured to provide the plurality of automatically generated, client-specific user interfaces specific for at least one application via Hypertext Transport Protocol to different client systems accessing said at least one application.

12. The cluster system according to claim 11, wherein the plurality of automatically generated, client-specific user interfaces comprises at least one of the following: a Hypertext Markup Language (HTML) interface, a web service interface provided via the Simple Object Access Protocol (SOAP), a Tool Command Language Toolkit (Tcl/Tk) script interface or a command line interface.

13. The cluster system according to claim 9, wherein the template management component comprises a transformation engine, which processes predetermined templates on the basis of retrieved configuration values for configuration parameters assigned to at least one configuration module.

14. The cluster system according to claim 13, wherein the transformation engine comprises an XSLT transformer, which processes predetermined style sheets corresponding to the predetermined templates.

15. The cluster system according to claim 9, wherein the cluster system is configured to provide a distributed data backup system.

16. A distributed, virtual tape library system for data backup, comprising:
 a configuration entity that stores and provides a plurality of configuration values assigned to configuration parameters for the distributed, virtual tape library system;
 a communication server that queries a type of a client system used by a user of the computer system and provides a plurality of automatically generated, client-specific user interfaces for the distributed, virtual tape library system, the user interface comprising a configuration interface that retrieves the plurality of configuration parameters and retrieves and/or changes the configuration values assigned to the configuration parameters; and
 a middleware layer, an application layer arranged above the middleware layer and a plurality of hardware components, wherein the at least one distributed, virtual tape library system is configured to use at least one middleware component of the middleware layer to manage and communicate with the plurality of hardware components by the application layer, the middleware layer comprising:
 the at least one configuration module and a template management component that retrieves configuration values for configuration parameters assigned to the at least one configuration module from the configuration entity using predetermined methods of the at least one configuration module, to select at least one template from a plurality of generic, client-specific templates based on the queried type, the templates being generic with respect to the at least one configuration module for presenting and/or changing the configuration values for the plurality of automatically generated, client-specific user interfaces, to enter said values into the at least one selected template and to output the at least one selected template filled with entered configuration values via the communication server based on the type of the client system used by the user.

17. The distributed, virtual tape library system according to claim 16, wherein the plurality of automatically generated, client-specific user interfaces comprises at least a first user interface for a graphical client software dependent on an operating system of the client system and a second user interface for a web-based user interface independent of the operating system of the client system.

18. The distributed, virtual tape library system according to claim 16, wherein the communication server comprises a web server configured to provide the plurality of automatically generated, client-specific user interfaces specific for at least one application via Hypertext Transport Protocol to different client systems accessing said at least one application.

19. The distributed, virtual tape library system according to claim 18, wherein the plurality of automatically generated, client-specific user interfaces comprises at least one of the following: a Hypertext Markup Language (HTML) interface, a web service interface provided via the Simple Object Access Protocol (SOAP), a Tool Command Language Toolkit (Tcl/Tk) script interface or a command line interface.

20. The distributed, virtual tape library system according to claim 15, wherein the template management component comprises a transformation engine, which processes predetermined templates on the basis of retrieved configuration values for configuration parameters assigned to at least one configuration module.

* * * * *